Aug. 28, 1951 — W. R. WRIGHT — 2,566,151
PROCESS FOR EDGE-COATING AND BENDING SHEET MATERIAL
Filed June 15, 1948 — 7 Sheets-Sheet 1
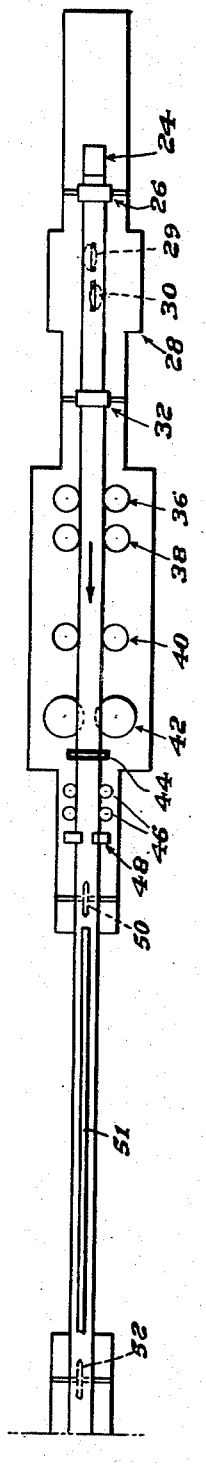
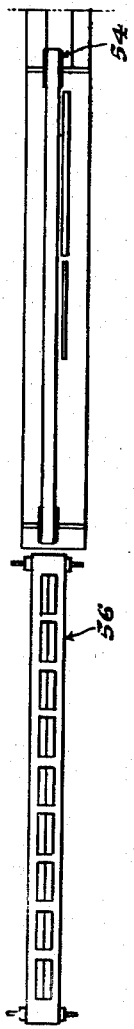
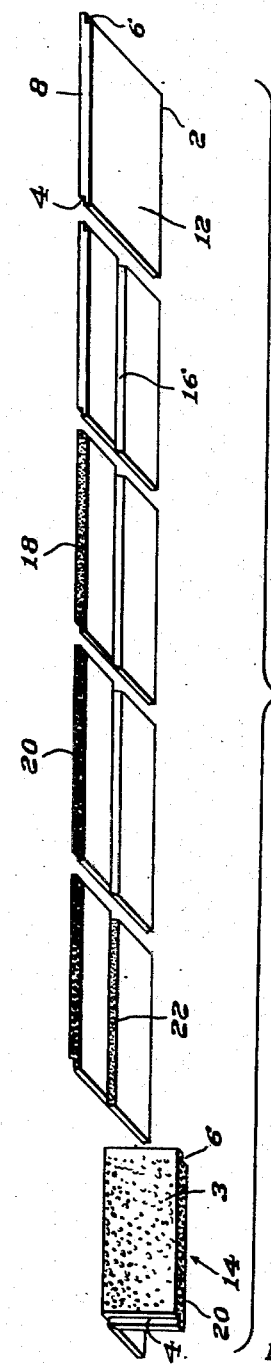
INVENTOR.
BY WILLIAM R. WRIGHT
ATTORNEY Aug. 28, 1951  W. R. WRIGHT  2,566,151
PROCESS FOR EDGE-COATING AND BENDING SHEET MATERIAL
Filed June 15, 1948  7 Sheets-Sheet 2
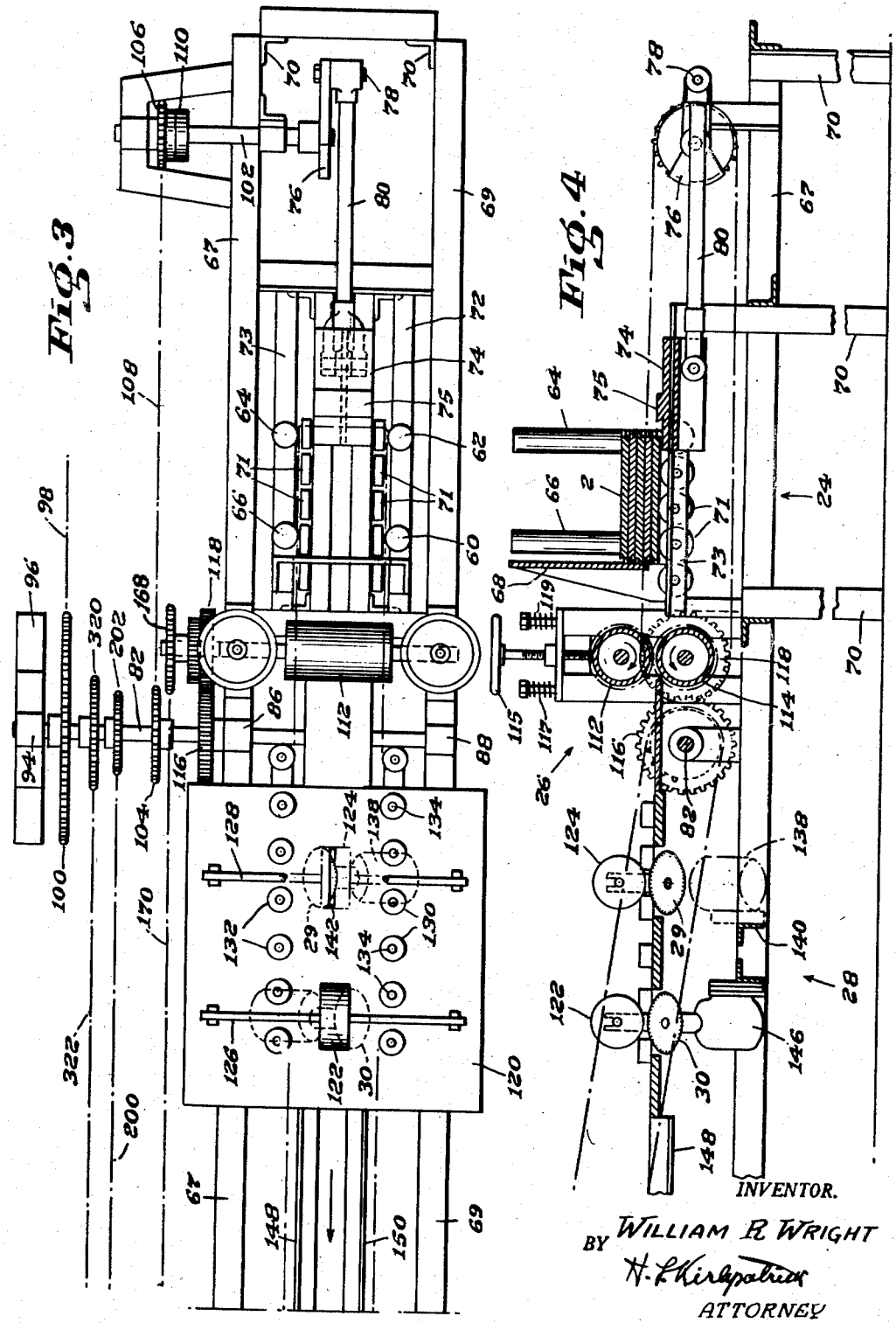
INVENTOR.
WILLIAM R. WRIGHT
BY H. F. Kirkpatrick
ATTORNEY

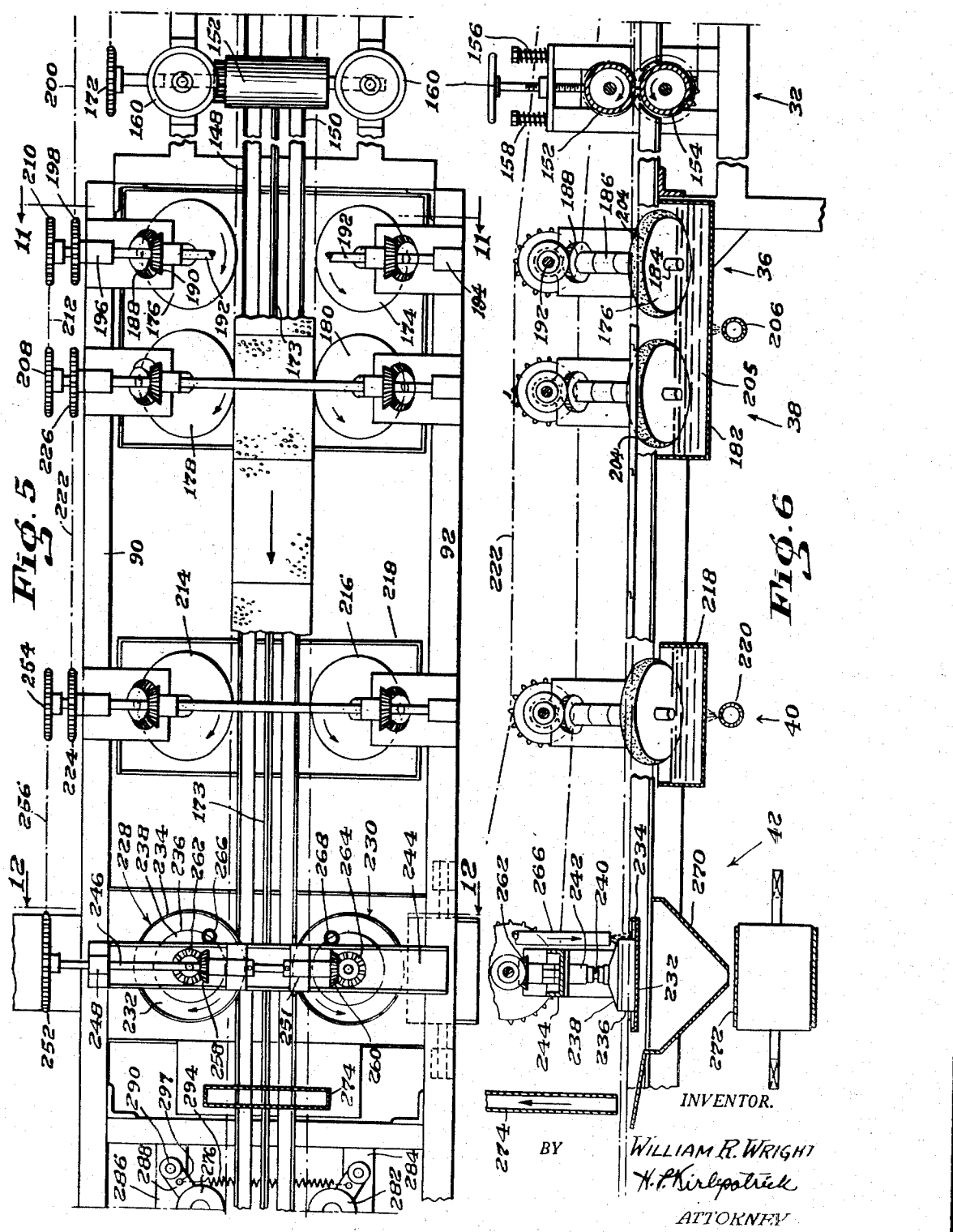

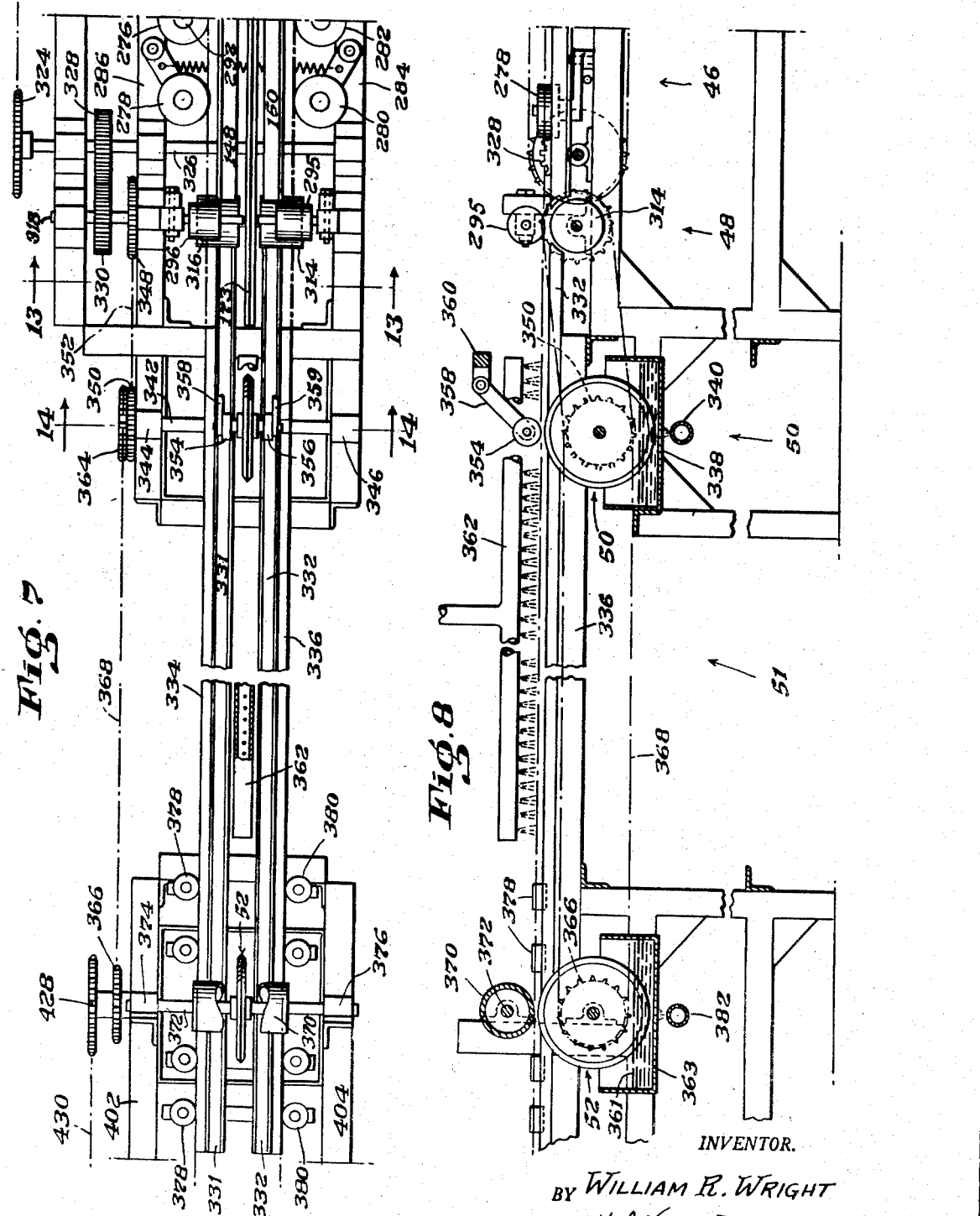

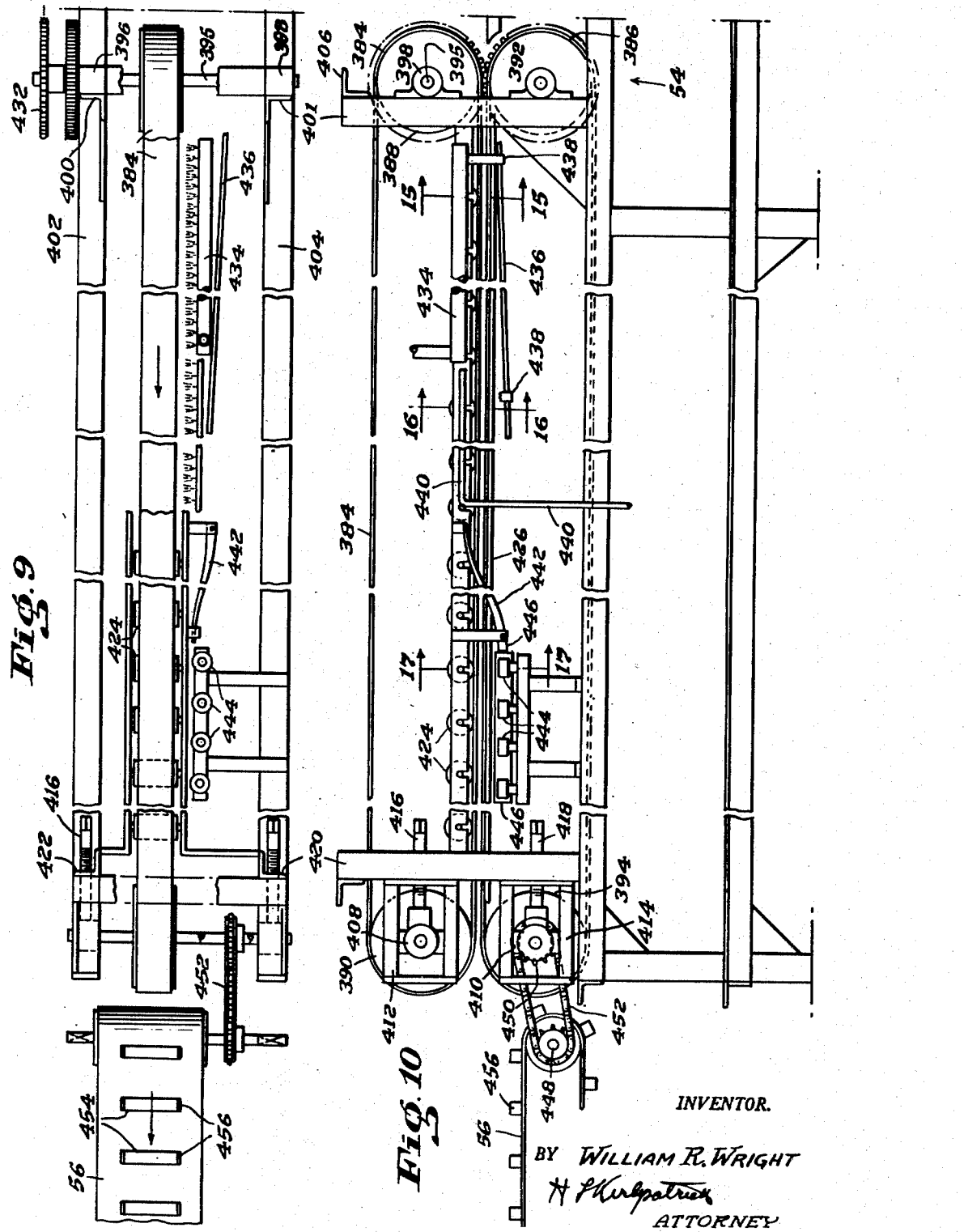

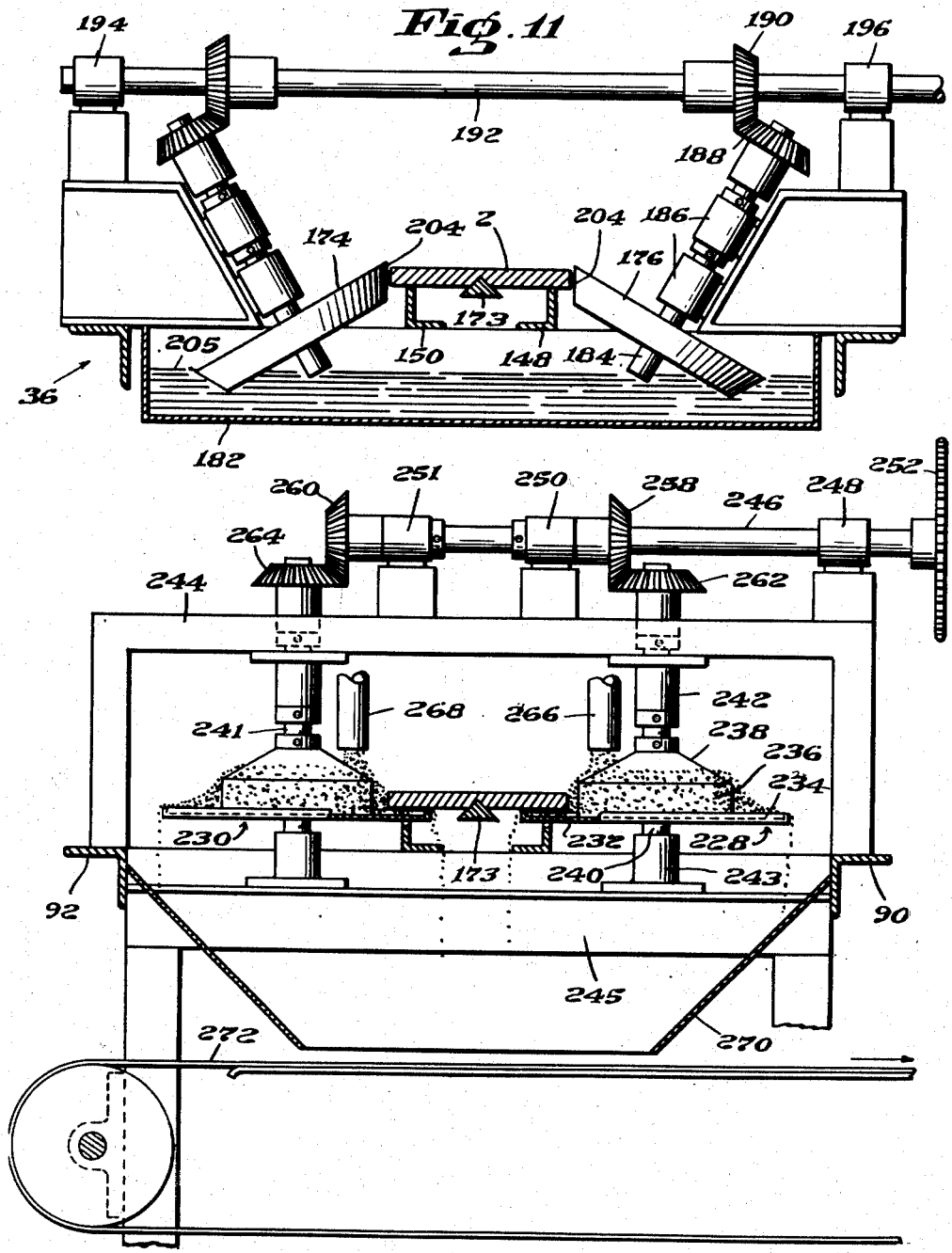

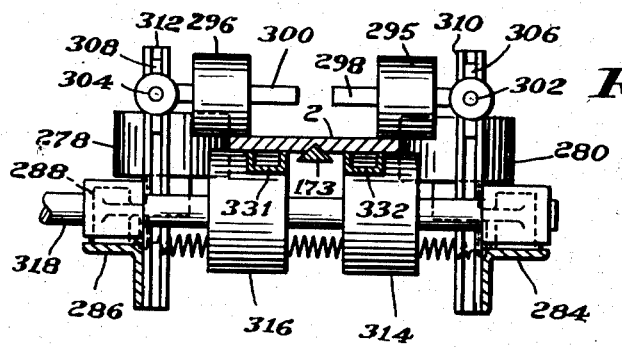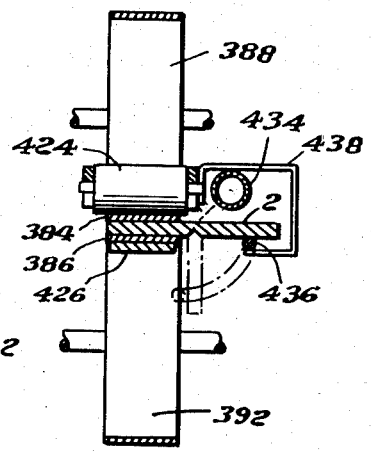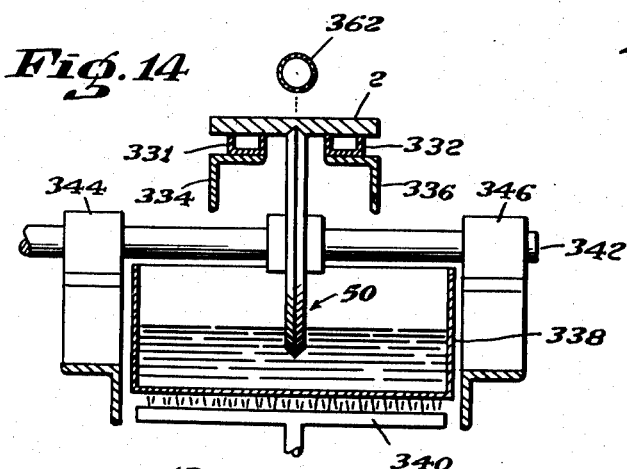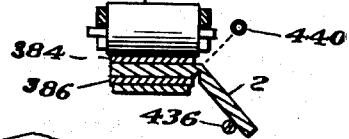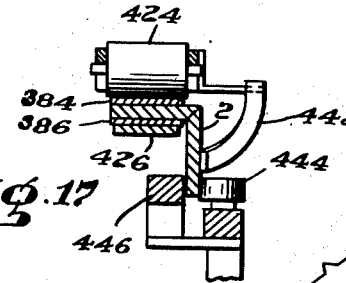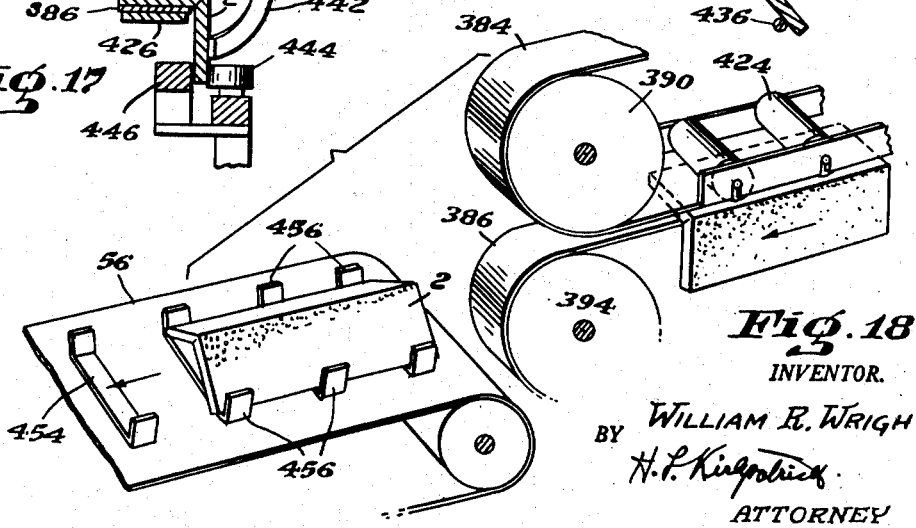

Patented Aug. 28, 1951

2,566,151

UNITED STATES PATENT OFFICE 2,566,151

PROCESS FOR EDGE-COATING AND BENDING SHEET MATERIAL

William R. Wright, Dedham, Mass., assignor to Bird & Son, Inc., East Walpole, Mass., a corporation of Massachusetts Application June 15, 1948, Serial No. 33,103

4 Claims. (Cl. 154—116)

The present invention relates to a process for coating opposite edges of flat blanks of sheet material and for forming such blanks into angular shape. The invention is particularly useful in forming building siding corner pieces from flat blanks of fibrous cellulosic stock impregnated with a thermoplastic material and will be further disclosed herein by reference to the manufacture of such units.

These corner pieces are applied outside the sheathing of a building at the corners, to form, in association with impregnated and grit-coated flat siding units, the exterior surface of the building. Such corner units have been manufactured from flat blanks which are formed by cutting them from larger sheet material which has been impregnated and then grit-coated on one face. In the past the corner pieces have been manufactured from such blanks primarily by a series of hand operations, which method of manufacture is time-consuming and costly.

An object of the invention is to provide a process by which flat sheet blanks of a material capable of being softened by heat may be automatically and rapidly bent into angular shape.

A further object is to provide a process by which flat sheet blanks may be coated on opposite edges with a thermoplastic material, and thereafter coated with a loose granular grit to provide a level, water-proof grit coating, and in which such operations may be performed continuously and automatically on a series of the blanks at low cost.

Another object is to provide a process by which flat sheet blanks of fibrous cellulosic material impregnated with a thermoplastic material, grit coated on one flat face and shiplapped at their opposite ends, may be continuously grit coated on their lateral edges and bent into angular shape to provide a building siding corner unit.

Other objects and advantages of the invention will become apparent as it is better understood from the following detailed description of a presently preferred embodiment shown in the accompanying drawings, wherein:

Figs. 1 and 1a together are a diagrammatic plan view of a machine by which my process can be performed;

Fig. 2 illustrates schematically the series of operations comprising my process;

Fig. 2a is a diagram showing the relationship in which the sheets containing Figs. 3, 4, Figs. 5, 6, Figs. 7, 8 and Figs. 9, 10 are to be placed to show the entire machine of Fig. 1;

Figs. 3, 5, 7 and 9 when placed end to end in the relationship shown in Fig. 2a form a plan view of the entire machine of Fig. 1;

Figs. 4, 6, 8 and 10 similarly form a side elevation of the machine of Figs. 3, 5, 7 and 9;

Fig. 11 is a vertical transverse sectional view on the line 11—11 of Fig. 5;

Fig. 12 is a vertical transverse section on the line 12—12 of Fig. 5;

Fig. 13 is a vertical transverse section taken on the line 13—13 of Fig. 7, showing the grit embedding and leveling rolls;

Fig. 14 is a vertical transverse sectional view on the line 14—14 of Fig. 7;

Fig. 15 is a vertical transverse sectional view taken on the line 15—15 of Fig. 10;

Figs. 16 and 17 are vertical transverse sectional views illustrating the bending apparatus and taken respectively on the lines 16—16 and 17—17 of Fig. 10; and Fig. 18 is a detailed fragmentary perspective view of the structure shown at the left of Fig. 10.

The process of this invention is useful generally for bending and for coating opposed edges of flat sheet materials which are capable of being softened by the application of heat. The particular machine disclosed in the drawing has been designed to carry out this process on flat sheet blanks to convert them into building siding corner units, and includes structural details peculiar to this particular application.

Referring to Fig. 2, such a blank is shown at 2. The blank in this instance is notched at opposite ends to form shiplaps 4 and 6, is made of a fibrous cellulosic material impregnated with a thermoplastic material, such as an asphalt, and has been coated with granular grit on its flat face 3 which faces upward in Fig. 2. The shiplaps 4 and 6 in the completed corner piece when applied to a building cooperate with the shiplaps in adjacent corner pieces to form a weather-tight, mechanically strong joint. The lateral edges 8, only one of which can be seen in Fig. 2, are not coated with grit and are in the raw condition resulting from cutting of the blank 2 from a larger strip. The lower face 12 of the blank likewise is free from grit coating.

Broadly, my process consists in feeding a series of such blanks 2 in succession from a magazine in such a way as to form a continuous ribbon of blanks in which adjacent blanks are interengaged at the shiplap notches in each. The ribbon of blanks is moved continuously past a series of stations at which a series of operations is performed on the blanks to convert them into the completed corner unit shown at 14 in Fig. 2.

The first such operation involves the cutting of a V-shaped groove 16 in the lower face 12 of the blank, along the longitudinal mid-line of the blank. Thereafter, the exposed lateral edges 8 of the blanks are coated with a thermoplastic material, such as a bituminous material, as indicated at 18, and then these coated edges are covered with loose granular grit 20, which is held in place on the blank by becoming embedded in and adhered to the coating.

At another station, preferably but not necessarily following the grit coating station, the groove 16 is coated with an adhesive thermoplastic material, such as a bituminous material, to form a coating 22 on the surfaces of the groove. Thereafter, the blanks are separated so that the adjacent ends of successive blanks in the ribbon are disengaged, the blanks are heated adjacent the groove 16 and are then bent to close the groove and unite its surfaces by means of the adhesive coating material 22. Finally, the blanks are cooled, preferably while they are held in bent condition to prevent loss of shape, to form the completed corner unit 14.

Referring to Figs. 1 and 1a, in which the illustrative machine is shown schematically, it will be seen that the arrangement of the various units of the machine follows generally the sequence of the process steps described. From a magazine at 24 the blanks are fed individually, grit-coated face upwardly, between a pair of feed rolls 26, so that each blank is interengaged at its leading edge with the preceding blank. Thereafter, the blanks, in a continuous ribbon, pass through a grooving station 28 in which a pair of angularly-disposed saws 29, 30 cut the V-shaped groove 16 in the lower face of the blank. On leaving the grooving station the blanks pass through a second pair of feed rolls 32 and into the grit-applying station in which pairs of coating disks 36, 38 apply a thin penetrative thermoplastic coating and a similar pair of coating disks 40 applies a more viscous coating to the opposite lateral edges 8 of the blanks. The grit is then placed on the coated edges by a rotary mechanism 42 and any loose grit is removed from the blanks at 44 and returned for re-use. Thereafter, the grit is leveled and embedded by a series of edge pressing rollers 46 engaging the lateral edges of the blanks and by rollers 48 engaging the top and bottom flat surfaces of the blank.

At a succeeding station the V-groove 16 is coated with a thin penetrative thermoplastic material by a coating wheel 50. The blanks next travel beneath a gas flame at 51 for a considerable distance so that the penetrative coating is absorbed and the material of the blank adjacent the groove 16 is softened. A second coating of thermoplastic material is applied to the groove by a coating wheel 52.

The blanks are then grasped between the opposed flights of a pair of horizontal belts 54 (Fig. 1a) by which they are advanced individually at a slightly increased speed so that they are separated from each other. The blanks are grasped and held by belts 54 on one side only of the groove 16 and while so held are further heated, to cause the unsupported side of the blank to sag and bend the blank about the apex of the groove 16 into the angular shape shown at 14 in Fig. 2.

On leaving this bending unit the blanks are received on a continuous delivery conveyor 56 from which they may be lifted manually and packed into shipping containers. Preferably the conveyor 56 includes means for holding the blanks in bent shape to assure that they will not lose shape before they have cooled.

Referring to Figs. 3 to 18, the illustrative machine shown in the drawings will now be described in detail.

The magazine 24 for holding a stack of flat blanks 2 (Figs. 3 and 4) is formed by four vertical standards 60, 62, 64 and 66 and a vertical flat plate 68 supported by longitudinal angle-iron frame members 67, 69 forming part of the main frame of the machine. The frame-members 67, 69 are supported from the floor by any suitable number and arrangement of angle-iron legs 70. Stacks of blanks may be supplied to the magazine by hand. The blanks in the magazine are engaged at their forward edges by the plate 68 which prevents forward movement of all of the blanks in the magazine except the lowermost blank. The lowermost blank rests on a series of rotatable rollers 71, supported from the main frame on angles 72, 73, in which they are journaled.

The blanks are fed individually from the bottom of the stack of blanks by a reciprocating feeder carriage 74 whose upper surface is approximately at the same elevation as the uppermost parts of rollers 71. The feeder carriage carries on its upper surface a transverse pusher bar 75, which extends upwardly from the surface a distance less than the thickness of a single blank so that the pusher bar engages the lowermost blank at each forward stroke of the carriage and ejects it from the magazine. The feeder carriage is reciprocated by a crank disk 76 on shaft 102, to the crank pin 78 to which it is connected by a connecting rod 80. The stroke of the feeder carriage 74 may be, and preferably is, slightly greater than the length of a blank to assure tight engagement of each blank with the preceding blank notwithstanding slight differences in the lengths of the blanks.

The main drive shaft 82 of the machine is supported in a pair of bearings 86, 88 on longitudinal frame members 67, 69 and further supported at its outboard end in a bearing 94 mounted on a standard 96. The drive shaft 82 is driven from an electric motor or other source of power (not shown) through a chain 98 and a sprocket 100. From this main drive shaft 82 the mechanism at the various stations is driven through chain drives to be described.

The shaft 102 on which the crank disk 76 is mounted is driven from the drive shaft 82 by means of a sprocket 104 on the drive shaft, a sprocket 106 on shaft 102 and a chain 108 connecting the sprockets. The sprocket 106 is connected to shaft 102 through a spring-loaded slip clutch 110. Any slippage required by the fact that the stroke of the feeder carriage 74 is slightly greater than the length of the blanks is provided by this slip clutch.

From the magazine, the blanks pass into the first feed roll pair 26, which comprises the upper and lower rolls 112, 114 journaled on the frame members 67, 69. The feed rolls 26, in cooperation with the second set of feed rolls 32, serve to move the entire ribbon of blanks through the various work stations of the apparatus. These feed rolls are positively driven from the main drive shaft 82 by a spur gear 116 on the drive shaft and a spur gear 118 on the shaft of the lower feed roll 114. The upper roll 112 is mounted in a conventional way for vertical adjustment by means of a hand wheel 115 and is resiliently urged toward the lower roll 114 by compression springs 117, 119.

From the first set of feed rolls, the ribbon of blanks passes into the grooving station 28 where the pair of angularly-disposed cutting disks 29, 30 cut the groove 16 in its lower face. During this operation the blanks slide over the flat surface of a plate 120 against which they are held by a pair of free rollers 122, 124 supported respectively on shafts 126, 128 above the plate 120. The blanks are guided laterally by a series of rollers 130, 132, on opposite sides of the blanks, which are journaled on vertical pins 134 extending upwardly from plate 120. The cutting disk 29, which may be a toothed saw, is carried on the shaft of a motor 138 mounted on a transverse frame member 140 connected between the main frame members 67, 69 of the machine. The saw 29 is inclined at an angle of about 45° to the vertical and extends through a slot 142 in the plate 120 for a sufficient distance to cut the notch to the depth desired. The other side of the notch is cut by a saw 30 which is similar to the saw 29 in its mounting and function and is driven by a motor 146. The two saws together penetrate the blanks to a line which forms the apex of the groove so that the material of the blank between the cuts made by the saws is severed from and falls out of the blank.

On leaving the grooving station 28, the blanks are received on a trackway formed by a pair of spaced angles 148, 150 supported on the main frame of the machine with one leg disposed vertically, and spaced a distance slightly less than the width of the blanks. Each blank slides on these angles and is pushed by the following blanks into the second pair of feed rolls 32 (Figs. 5 and 6). The upper roll 152 of this pair is urged downwardly toward the lower roll 154 by means of springs 156, 158 and may be vertically adjusted by means of a hand wheel 160. The drive for rolls 152, 154 is derived from the shaft of feed roll 114 by means of a sprocket 168 on the latter and a chain 170 driving the sprocket 172 on the shaft of feed roll 154. The two sets of feed rolls are thus timed to rotate at the same speed, determined by the speed of main drive shaft 82 and the relative sizes of the spur gears 116, 118.

From the feed rolls 32 the blanks continue along angles 148, 150 into a coating station in which fluid thermoplastic material is applied to the opposite lateral edges of the blanks by the pairs of coating disks 36, 38 and 40. The blanks are now additionally supported by a triangular rail 173 (Figs. 5, 6 and 11) engaging groove 16 in the lower face of the blanks and thus maintaining the blanks in proper position laterally of the apparatus. Rotary coating disks 174, 176 forming the first pair, 36, and a similar set of disks 178, 180 forming the second pair 38, are provided for applying the fluid material to the edges of the blanks from a pan 182 supported on the main longitudinal frame members 90, 92. Since these pairs of disks are substantially identical, only one pair will be described in detail. The disk 176 is mounted on a shaft 184 which is supported for rotation in bearings 186 carried on the main frame. The upper end of the shaft 184 carries a bevel gear 188 which meshes with a bevel gear 190 on a transverse overhead shaft 192, supported from the frame in fixed bearings 194, 196. The shaft 192 carries a sprocket 198 which is driven through a chain 200 from the sprocket 202 on the main drive shaft 82. The coating disk 174 is supported and driven in a manner similar to disk 176. It will be observed that the disks 174, 176, 178 and 180 have beveled edges 204. The disks are inclined at such an angle that these beveled edges lie vertical at their line of contact with the edges of the blanks, so that the opposite edges of the disks are immersed in the liquid material 205 in the pan 182. The material 205 is heated to maintain its fluidity by a gas burner 206. The second set of coating disks 178, 180 is driven from the first set by a pair of sprockets 208, 210, and a chain 212.

The blanks next pass between the pair 40 of inclined coating disks 214, 216, which apply a more viscous thermoplastic coating to their lateral edges from a pan 218 in which the material is maintained at a suitable consistency by a gas burner 220. Disks 214, 216, are similar to the disks 178, 180 and are driven from the latter through a drive chain 222 and sprockets 224, 226. For coating building siding corner units, all of these coating disks may revolve in the same direction as and at a surface speed of approximately twice the linear speed of the blanks.

The blanks are next treated to apply loose granular grit to their lateral coated edges to cause this grit to be secured to the blanks by the coating material. During this operation the blanks remain in motion on the angles 148, 150 and rail 173. The grit is applied by means of a pair of rotary disks 228, 230 disposed below and on opposite sides of the path of travel of the blanks. The disk 228 comprises a flat plate 232 having an upstanding marginal rim 234 at its periphery. On the upper surface of plate 232 is a cylindrical hub 236 having a frusto-conical upper surface 238. The hub and disk are supported on a shaft 240 rotating in a bearing 242 carried by a transverse channel 244, and bearing 243 (Fig. 12) carried by a transverse frame member 245. The transverse channel 244 is disposed with its back downwardly and is supported from the main frame members 90, 92 at its opposite ends. A transverse shaft 246 journaled in bearings 248, 250 and 251 carried by the channel 244 is driven from the drive shaft of the pair of coating disks 40 by means of sprockets 252, 254 and a connecting chain 256. This transverse shaft carries a pair of bevel gears 258, 260 which mesh with bevel gears 262, 264 on the vertical shafts 240, 241 respectively to drive the latter and the grit applying disks 228, 230. The loose granular grit is fed to disks 228, 230 by vertical supply pipes 266, 268 so that loose grit piles up on each wheel within rim 234 and over the cylindrical frusto-conical surfaces of the hubs, as shown in Fig. 12. The disks 228, 230 are disposed in close proximity to the path of travel of the blanks with the plates and rims beneath and overlapping the path of travel and the hubs adjacent to but spaced from the blanks.

The grit which piles up on the disks in loose condition is picked up by the coated edges of the blanks and adhered thereto. Grit is supplied to the disks at such a rate that an excess is continually falling from the edge of the disks. This excess is guided by a chute 270 on to a transverse conveyor 272 which returns it for re-use in feeding supply pipes 266, 268.

A vacuum nozzle 274 having its open lower end disposed immediately above the blanks as they leave the grit-applying disks serves to pick up any loose grit carried along by the blanks. The nozzle 274 discharges into the supply bin (not shown) for the supply pipes 266, 268.

As the blanks leave the grit coating station their coated lateral edges 8 are engaged by the edge pressing rollers 46 which level and embed the grit coating. This set of rollers comprises four rollers 276, 278, 280, 282 (Figs. 5, 6, 7 and 8) mounted on auxiliary longitudinal frame members 284, 286. The mounting for each roller is similar to that of roller 276 which comprises a link 288 pivoted on a vertical pin 290 on frame member 286 and carrying at its outer end the shaft 292 for the roller. The link 288 is urged inwardly by a coil spring 294 anchored at 297 to the link 288 and similarly anchored at its opposite end to the link which carries roll 282. The four rollers of this set are freely rotatable on their journals and roll on the rough surface of the grit coating.

On leaving the roll set 46 the blanks are engaged on their upper and lower surfaces adjacent their lateral edges by the set of rolls 48 which serve further to level and embed the grit coating. The upper rolls of this set 295, 296 (Fig. 13), are journaled on axles 298, 300 respectively which in turn are pivoted at 302, 304 on vertically adjustable blocks 306, 308 mounted on guideways 310, 312. The axles 298, 300 pivot freely about the pivots 302, 304 so that the rollers 295, 296 rest on the upper surface of the traveling blanks primarily under their own weight.

Beneath the rollers 295, 296 the edges of the blanks are supported by driven rolls 314, 316 mounted on a common shaft 318 which is journaled at each end on the auxiliary longitudinal frame members 284, 286. These rolls are driven from the main drive shaft 82 through a sprocket 320 on the latter, a chain 322, a sprocket 324 on a counter shaft 326, and a pair of spur gears 328 and 330 connecting the counter-shaft to the shaft 318. Preferably the rolls 314, 316 rotate at the same surface speed as the blanks.

The trackway angles 148, 150 terminate upon reaching the set of rollers 48 and the blanks thereafter are carried on a pair of channel members 331, 332 disposed with their backs downwardly and supported on auxiliary frame members 334, 336 formed by angle irons. The triangular rail 173 terminates a short distance beyond the rolls 48.

The blanks next pass above the coating wheel 50 which applies liquid thermoplastic material to the grooves 16 in the bottom faces of the blanks. The thermoplastic material is contained in a pan 338 which is heated by a gas burner 340. The wheel 50 is journaled on a transverse shaft 342 supported in bearings 344, 346 and driven from shaft 318 by means of a sprocket 348 on the latter, a sprocket 350 and connecting chain 352. The wheel 50 is of such a diameter and is so positioned vertically that its lower edge is immersed in the pan 338 and its upper edge engages in the groove 16. The blank is engaged from above by a pair of freely rotatable rollers 354, 356 journaled in arms 358, 359 pivoted on a transverse support 360 whereby proper contact between the blank and the coating wheel 50 is maintained. The material contained in pan 338 is a relatively fluid material capable of penetrating the fibrous stock of the blanks. During the coating operation and for a considerable period thereafter the upper surfaces of the blanks are heated adjacent the groove 16 by gas flames directed from a burner 362 disposed immediately above the path of travel of the blanks, which heating assures adequate penetration of the coating material into the blank and softens the blanks preliminary to the bending operation.

The grooves 16 are next coated with a relatively more viscous thermoplastic material 361 from pan 363 by a coating wheel 52 similar to the wheel 50 and driven from the shaft of the latter through sprockets 364, 366 and the chain 368. During this coating step the upper surface of the blank is engaged by a roller 370 carried on a shaft 372 which is journaled in rigidly mounted bearings 374, 376 so that the blanks are positively engaged between the coating wheel 52 and the roller 370. Lateral alignment of the blanks with wheel 52 is maintained by a series of rollers 378 at one side of the blank in cooperation with a similar series of rollers 380 at the opposite side of the blank. The desired viscosity of the material 361 is maintained by a gas burner 382. The supporting channel members 331, 332 terminate a short distance beyond the coating wheel 52 but continue to support the blanks while they are engaged between the coating wheel 52 and the roller 370.

After the blanks pass out of engagement with roller 370 they are grasped by a pair of horizontal belts 384, 386 whose adjacent flights travel in the same direction as the blanks. The upper belt 384 is trained about a pair of pulleys 388, 390 and the lower belt 386 trained about a pair of pulleys 392, 394. Pulley 388 is carried on a shaft 395 journaled in bearings 396, 398 carried by vertical standards 400, 401 which rise from longitudinal frame members 402, 404 and are joined at their upper ends by a transverse channel member 406. Pulley 392 is similarly supported.

Pulleys 390 and 394 are mounted for adjustment toward and away from pulleys 388, 392 respectively by means of bearing blocks 408, 410 slidable in ways 412, 414 and are urged away from their companion pulleys by threaded adjusting rods 416, 418. These pulley mountings are carried on a pair of vertical standards 420, 422 supported on the longitudinal frame members 402, 404.

The lower flight of belt 384 is supported against upward movement by a series of individually suspended ball-bearing rollers 424. The upper flight of the lower belt 386 is supported on a horizontal plate 426. The belts are driven from the shaft of coating wheel 52 through a sprocket 428, a chain 430, and a sprocket 432 on the shaft of pulley 392 and at such a speed that each blank as it is grasped between the belts is drawn out of engagement with the following blank, which is still held between roller 370 and the coating wheel 52. Thereafter the blanks travel through the machine individually, separated by a short interval, which may be about 2 inches in length. During the first part of their travel between the belts 384, 386 the blanks are additionally heated by the flames from a gas burner 434. As a result of this heating, the blank is so softened in the region adjacent the groove 16 that the outer part of the blank which is not supported by the belts (Fig. 15) begins to sag, causing the blank to bend (Fig. 16) and close the groove 16 (Fig. 17). A guide rail 436 supported on a bracket 438 may be provided to suport the free portion of the blank against too rapid downward movement under its own weight. A nozzle 440 is positioned so as to direct a blast of air at room temperature against the blank as it leaves the region heated by the gas burner 434, and after the bending operation on the blank has begun. This air blast provides means for controlling the softness of the blank during bending and may be required only in warm weather.

An additional guide rail 442 positioned to engage the upper surface of the unsupported edge of the blank is provided for assuring that all of the blanks will be bent to the desired shape. The guide rail 442 is so curved that as the blank passes out of engagement with it the portion of the blank extending outwardly from the belt is substantially vertical and in position to be engaged by a series of rollers 444 so disposed as to hold the blank against a straight rail 446 with the portions of the blank on opposite sides of the groove at a right angle to each other and with the groove closed.

On leaving the belts 384, 386 the blanks are delivered to the belt conveyer 56 driven from the shaft of pulley 394 by sprockets 448, 450 and chain 452. The conveyor 56 carries a series of clips 454 having upstanding ends 456 spaced the proper distance to engage the blanks as shown in Fig. 18 and hold them in the desired bent position so that they can not sag before they have thoroughly hardened by cooling. The completed corner pieces may be lifted from the conveyor 56 by hand and placed directly into shipping containers.

The machine disclosed herein is claimed in my copending application, Serial No. 111,006 filed August 18, 1949.

I claim:

1. The method of bending flat sheet blanks of a material capable of being softened by heat which comprises continuously feeding such blanks into a continuous ribbon, cutting a V-shaped groove in the lower face of the blanks in the travelling ribbon, coating the V-shaped groove with a thermoplastic adhesive material, heating the upper face of the blanks in the region of the coated groove to soften them while supporting the blanks solely on one side of the groove so that the unsupported parts of the blanks sag under their own weight and the blanks bend along a line adjacent the apex of said groove to close the groove, and cooling the bent blanks while they are in bent condition.

2. The method of bending flat sheet blanks of a material capable of being softened by heat into angular shape which comprises continuously feeding such blanks into a continuous ribbon with successive blanks in engagement, cutting a V-shaped groove in a flat face of the blanks in the traveling ribbon, coating the V-shaped groove with an adhesive thermoplastic material, separating successive blanks of the ribbon to disengage their adjacent edges, heating the blanks in the region of the coated groove to soften them and then bending the heated blanks about a line adjacent the apex of the said groove to close the groove and adhesively unite the surfaces of the groove by the thermoplastic adhesive material therein.

3. The method of making angular building siding corner pieces from flat sheet blanks of cellulosic fibrous stock impregnated with a thermoplastic material and coated with grit on one flat face which comprises continuously feeding such blanks with the grit-covered face upward into a continuous ribbon, cutting a V-shaped groove in the lower uncoated face of the blanks in the traveling ribbon, coating the lateral edges of the blanks in the ribbon with a thermoplastic material, applying loose granular grit to said coated edges and then embedding and leveling such grit, coating the V-shaped groove with a thermoplastic adhesive material, heating the blanks in the region of the coated groove to soften them while supporting the blanks solely on one side of the groove so that the unsupported parts of the blanks sag and the blanks bend along a line adjacent the apex of said groove to close the groove, and cooling the bent blanks while maintaining them in bent condition with the groove closed.

4. The method of making angular building siding corner pieces from flat sheet blanks of cellulosic fibrous stock impregnated with a bituminous material coated with grit on one flat face and shiplapped at opposite ends which comprises continuously feeding such blanks, grit-covered face upward, into a continuous ribbon with successive blanks interengaged at the shiplapped edges, cutting a V-shaped groove in the lower, uncoated face of the blanks in the traveling ribbon, coating the lateral edges of the blanks in the ribbon first with a penetrative fluid bituminous material and then with a more viscous bituminous material, applying loose granular grit to said coated edges and then embedding and leveling such grit, coating the V-shaped groove first with a penetrative fluid bituminous material and then with a more viscous bituminous material, separating successive blanks of the ribbon to disengage their shiplapped edges while maintaining the blanks in motion, heating the blanks in the region of the coated groove to soften them and then bending the heated blanks about a line adjacent the apex of the groove to close the groove and adhesively unite the surfaces of the groove by the bituminous material therein, and finally cooling the bent blanks while maintaining them in bent condition with the groove closed.

WILLIAM R. WRIGHT.

REFERENCES CITED

The following references are of record in the file of this patent:

UNITED STATES PATENTS

| Number | Name | Date |
|---|---|---|
| 1,927,445 | Palmer et al. | Sept. 19, 1933 |
| 2,101,589 | MacLean | Dec. 7, 1937 |
| 2,163,757 | MacLean et al. | June 27, 1939 |
| 2,252,539 | Adams | Aug. 12, 1941 |
| 2,291,171 | Muench | July 28, 1942 |
| 2,296,890 | Albertson | Sept. 29, 1942 |
| 2,360,918 | Wade | Oct. 24, 1944 |
| 2,392,734 | Haberstump | Jan. 8, 1946 |
| 2,431,353 | Varner et al. | Nov. 25, 1947 |